United States Patent [19]

Cicchetti et al.

[11] 4,363,906
[45] Dec. 14, 1982

[54] CONDENSATION PRODUCT PREPARED FROM N,N'-ETHYLENE-UREA AND FORMALDEHYDE

[75] Inventors: Osvaldo Cicchetti; Spartaco Fontani; Gianluigi Landoni, all of Milan; Renato Locatelli, Ferrara; Guido Bertelli, Ferrara; Pierpaolo Roma, Ferrara, all of Italy

[73] Assignee: Montedison S.p.A., Milan, Italy

[21] Appl. No.: 250,102

[22] Filed: Apr. 2, 1981

[30] Foreign Application Priority Data

Apr. 3, 1980 [IT] Italy ................ 21165 A/80

[51] Int. Cl.³ ............ C08G 2/00; C08G 12/34
[52] U.S. Cl. ............... 528/248; 524/593; 524/597; 528/252
[58] Field of Search ............ 528/248, 252; 260/29.2 N; 524/593, 597

[56] References Cited

U.S. PATENT DOCUMENTS

| | | | |
|---|---|---|---|
| 2,518,963 | 8/1950 | Weaver | 528/248 |
| 3,641,196 | 2/1972 | Sander et al. | 528/252 |
| 3,836,605 | 9/1974 | Ricker et al. | 528/252 |
| 4,193,945 | 3/1980 | Bertelli et al. | 525/2 |

*Primary Examiner*—Lucille M. Phynes

[57] ABSTRACT

There is disclosed a solid and water-insoluble condensation product of N,N'-ethyleneurea with formaldehyde, having the structure

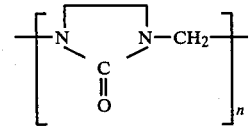

wherein n is an integer from 20 to 60 with a mean value of 41, and having an average number molecular weight $\overline{M}_n$ ranging from 2000 to 6000. Said product, when added to a polymer in combination with an ammonium phosphate, results in the production of articles which are resistant to heat and to thermo-oxidation.

4 Claims, No Drawings

CONDENSATION PRODUCT PREPARED FROM N,N'-ETHYLENE-UREA AND FORMALDEHYDE

BACKGROUND OF THE INVENTION

U.S. Pat. No. 4,193,945, assigned to Montedison, S.p.A., describes self-extinguishing polymeric compositions containing, as a flame-retardant additive, a mixture of an ammonium phosphate and of a nitrogen-containing compound selected from a group of compounds comprising also a product of condensation between N,N'-ethyleneurea and formaldehyde.

Such compositions are endowed, on one hand, with excellent flame-retardant properties, but exhibit, on the other hand, a low resistance to heat and to thermo-oxidation. In fact, in the molding of manufactured articles at temperatures higher than 200° C., those polymeric compositions undergo color changes with gradual turning from white to light hazel, dark hazel and finally brown. Furthermore, the specimens obtained from such compositions and maintained for a certain time-period at high temperatures in a forced draught furnace lose their uninflammability after a certain number of days (the oxygen index decreases from 30 to less than 25) and become brittle even if they had been prepared from antioxidant-containing polymeric compositions.

THE PRESENT INVENTION

One object of the present invention is to provide a solid and water-insoluble condensation product of N,N'-ethyleneurea and formaldehyde, of the type disclosed in U.S. Pat. No. 4,193,945 but which does not cause, or causes only to a slight extent, the above-mentioned adverse effects when it is added to a polymer, in particular a polyolefin, in combination with an ammonium phosphate. Such product has the structure

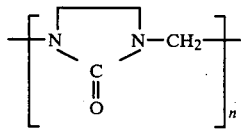

wherein n is an integer from 20 to 60 having a mean value of 41, and having an average number molecular weight $\overline{M}_n$ ranging from 2,000 to 6,000.

The above structure is confirmed by the NMR analysis. On X-ray analysis, the product exhibits a pattern characteristic of the prevailingly amorphous substances.

With respect to the condensation product of N,N'-ethyleneurea with formaldehyde described in U.S. Pat. No. 4,193,945, the product according to this invention offers the following advantages:
  a higher resistance to heat and to thermo-oxidation;
  a higher polycondensation degree;
  lower percentages of low molecular weight fractions which, as is known, are more thermo-oxidizable;
  a lower crystallinity degree which permits, among other things, an easier mixing with the polymeric matrix; and
  a lower hygroscopicity and electrostaticity degree.

The new condensation product can be prepared by reacting, in an aqueous medium, under stirring, equimolar amounts of N,N'-ethyleneurea and formaldehyde, at a pH of about 2 and at a temperature ranging from 0° to 40° C., preferably from 25° to 30° C. The formaldehyde can be added according to any modality, provided the temperature remains in the above-stated range.

Condensation can be carried out, also, in an organic solvent, and in such case the temperature employed ranges from 10° to 70° C. Employable organic solvents are formic acid, acetic acid, methylene chloride, chloroform, fluoroalcohols or mixtures of such compounds.

The above preparation methods are different from those described in the literature and from the process described in U.S. Pat. No. 4,193,945.

Some examples of the condensation of N,N'-ethyleneurea with formaldehyde are given hereinafter. The products according to this invention are those of Examples 4, 5 and 8: the other examples are given for comparative purposes.

EXAMPLE 1

This example illustrates, for comparative purposes, the preparation of a condensation product of N,N'-ethyleneurea with formaldehyde according to the method described in U.S. Pat. No. 4,193,945.

N,N'-ethyleneurea was dissolved in water in an amount corresponding to 50 g/liter, it was acidified with diluted sulphuric acid to a pH value of 2, it was heated to 90° C., whereupon an aqueous solution of formaldehyde at 37% by weight was dropped into the ethyleneurea solution maintained at 90° C. and under intense stirring, till reaching a molar ratio $CH_2O$/ethyleneurea equal to 2. The finely particled precipitate so obtained was filtered, washed with water and dried.

EXAMPLE 2

Condensation at pH=2 and at 75° C.

A solution prepared by dissolving 95 g of N,N'-ethyleneurea in the form of hemihydrated crystals (1 mole) in 600 cc of deionized water was introduced into a 1-liter glass flask equipped with a stirrer and a thermometer and immersed in a water bath. It was acidified with concentrated sulphuric acid to a pH of 2 and 87 g of aqueous formaldehyde at 35% by weight (1 mole) were added to said solution by dropping. The whole was heated at 75° C. under stirring for 8 hours, then it was allowed to cool down to room temperature. It was filtered and the cake was washed with water to neutrality. 94 g of product, corresponding to a yield of about 96% in respect of the theoretical value, were obtained.

EXAMPLE 3

Condensation at 75° C. in aqueous HCl at 18% by weight.

A solution prepared by dissolving 95 g of N,N'-ethyleneurea in the form of hemihydrated crystals (1 mole) in 400 cc of aqueous HCl at 18% by weight was introduced into a flask like the one of Example 2. There were added 87 g of aqueous formaldehyde at 35% by weight (1 mole) and the whole was then heated under stirring at 75° C. for 8 hours.

It was allowed to cool down to room temperature, obtaining an easily filterable product. After filtration, the cake was washed with water to neutrality. 91.1 g of a crystalline condensation product corresponding to a yield of about 93% were obtained.

EXAMPLE 4

Preparation of the product according to the invention marked by item "MF 80".

A solution prepared by dissolving 95 g of N,N'-ethyleneurea in the form of hemihydrated crystals (1 mole) in 600 cc of deionized water was introduced into a flask like that of Example 2. It was acidified with concentrated sulphuric acid to a pH of 2, whereupon 87 g of aqueous formaldehyde at 35% by weight (1 mole) were added to the solution, subjected to stirring, operating in such manner as to keep the temperature at about 25° C. without exceeding 30° C. and reacting for 48 hours. The reaction mixture was then neutralized with an aqueous NaOH solution and filtered. After washing with water, the cake was squeezed and dried at 110° C. A condensation product in the form of a white and flowing powder having a weight of 94.2 g, corresponding to a yield of 96%, was obtained.

EXAMPLE 5

Condensation at a pH=2 and at 5° C.

A solution prepared by dissolving 380 g (4 moles) of N,N'-ethyleneurea in the form of hemihydrated crystals in 3,600 cc of deionized water was introduced into a 5-liter glass reactor equipped with a thermometer, a stirrer and an automatic thermoregulator. It was acidified with concentrated sulphuric acid up to a pH of 2, cooled down to 5° C. under stirring, and 348 g of a formaldehyde aqueous solution at 35% (4 moles) were introduced by dropping, in 1 hour. It was reacted at 5° C. for 55 hours, whereupon it was filtered at such temperature. The cake was washed with water to neutrality, it was squeezed and dried at 115° C. 340.6 g of product, corresponding to a yield of 86.9%, were obtained.

EXAMPLE 6

Condensation at a pH=2 and at 60° C.

A solution prepared by dissolving 380 g (4 moles) of N,N'-ethyleneurea in the form of hemihydrated crystals in 3,600 cc of deionized water was introduced into a 5-liter glass reactor equipped with an agitator, a thermometer and a water bath. It was acidified with concentrated sulphuric acid to a pH of 2; 375 g of a formaldehyde aqueous solution at 32% by weight (4 moles) were added and the whole was heated under stirring at 60° C. for 8 hours. It was then allowed to cool down to room temperature, filtered and the cake was washed with water to neutrality and dried. 353 g of product corresponding to a yield of 90% were obtained.

EXAMPLE 7

Condensation at a pH=4 and at 100° C.

A solution obtained by dissolving 190 g (2 moles) of N,N'-ethyleneurea in the form of hemihydrated crystals in 1,800 cc of deionized water was introduced into a 3-liter glass flask equipped with an agitator, a thermometer, a reflux cooler and an oil heating bath. It was acidified with concentrated sulphuric acid to a pH of 4, 187.5 g of an aqueous formaldehyde solution at 32% by weight (2 moles) were added, and the whole was heated at 100° C. for 27 hours. It was allowed to cool down to room temperature, filtered, washed with water to neutrality and dried. 90.2 g of product, corresponding to a yield of about 46%, were obtained.

EXAMPLE 8

Condensation at 60° C. in an organic solvent.

Into a 2-liter glass reactor, equipped with an agitator, a reflux cooler, a modified Markusson separator, a thermometer and a water bath, the following was introduced:

- 86 g (1 mole) of N,N'-ethyleneurea anhydrified through melting under vacuum;
- 30 g of trioxane (1 mole $CH_2O$);
- 800 cc of chloroform;
- 200 cc of glacial acetic acid;
- 1 g of p-toluene-sulphonic acid.

The whole was heated at reflux (60° C.) until water no longer formed in the separator. Finally, chloroform and acetic acid were removed at reduced pressure. The residual solid mass was washed with water to neutrality and then dried at 110° C. 76.4 g of product, corresponding to a yield of about 78%, were obtained.

The chemical-physical characteristics of the condensation products prepared in the examples are indicated in Table I.

The intrinsic viscosity was determined at 25° C. using as a solvent an azeotropic mixture $CHCl_3/CH_3OH$ in the weight ratio 87:13.

The average molecular weight $\overline{M}_n$ was determined according to the osmometric method and employing the same solvent. The crystallographic analysis was carried out by X-ray spectrum on powder.

TABLE I

Chemical-physical properties of the condensation products prepared in the examples

| Example | Thermogravimetric analysis in air 20° C./min. | Differential calorimetric analysis in air; 10° C./min. | $\eta$ dl/g | Molecular weight $\overline{M}_n$ | Crystallographic analysis |
|---|---|---|---|---|---|
| 1 | $T_1$ = 252° C. $T_5$ = 288° C. $T_{10}$ = 304° C. $T_{50}$ = 350° C. | Oxidation: weak exo peak at 252° C., main exo peak at 307° C. | $7.34 \times 10^{-2}$ | 1055 | — |
| 2 | $T_1$ = 257° C. $T_5$ = 288° C. $T_{10}$ = 301° C. $T_{50}$ = 342° C. | — | $5.08 \times 10^{-2}$ | 757 | — |
| 3 | $T_{10}$ = 312° C. $T_{50}$ = 346° C. | — | $3.64 \times 10^{-2}$ | 561 | Substantially crystalline |
| 4 | $T_1$ = 287° C. $T_5$ = 303° C. $T_{10}$ = 353° C. $T_{50}$ = 380° C. | Oxidation: only one exo peak at 305° C. | $32.62 \times 10^{-2}$ | 4048 | Weakly crystalline or having an amorphous content >50% |
| 5 | — | — | $17.76 \times 10^{-2}$ | 2340 | — |
| 6 | — | — | $8.02 \times 10^{-2}$ | 1142 | — |
| 7 | — | — | $11.34 \times 10^{-2}$ | 1560 | — |

TABLE I-continued
Chemical-physical properties of the condensation products prepared in the examples

| Example | Thermogravimetric analysis in air 20° C./min. | Differential calorimetric analysis in air; 10° C./min. | $\eta$ dl/g | Molecular weight $\overline{M}_n$ | Crystallographic analysis |
|---|---|---|---|---|---|
| 8 | — | — | $26.5 \times 10^{-2}$ | 3360 | — |

To obtain a self-extinguishing polymeric composition having improved stabilities to heat and to thermo-oxidation, an ammonium phosphate and a nitrogen containing condensation product according to the invention were added to a thermoplastic polymer (in particular a polyolefin) in amounts of 10-20 parts and 5-8 parts respectively for 100 parts by weight of the total composition.

Good results are also achieved by employing, instead of the condensation product according to the invention, a mixture thereof with minor amounts of a condensation product of N,N'-ethyleneurea with formaldehyde having a molecular weight lower than 2,000 but being crystalline.

Among the various employable phosphates, the preferred are the ammonium polyphosphates comprised in the general formula $(NH_4)_{n+2}P_nO_{3n+1}$, wherein n is an integer equal to or higher than 2, the molecular weight of the polyphosphates having to be high enough ($400 \leq n \leq 800$) to ensure a low solubility in water.

The crystalline form of the ammonium polyphosphates which, as is known (JACS, 91:1-1.1.1969), can be of five types, shall be prevailingly of type II, in order to further increase the thermal stability of the N,N'-ethyleneurea/$CH_2O$-polyphosphate combination.

Other types of utilizable phosphates are those deriving from amines, such as, for example, dimethyl ammonium phosphate or diethyl ammonium phosphate, ethylenediamine phosphate, and melamine ortho- or pyrophosphate.

The thermal stability characteristics of N,N'-ethyleneurea/$CH_2O$-polyphosphate mixtures in the weight ratio 2:5 are indicated in the following Table.

The condensation products employed were the products described in Examples 1 and 4, while the ammonium polyphosphate (APP) was the one sold by Farbwerke Hoechst under the trade name "Exolit 263".

The comparison points out the higher thermal stability of the mixture containing the condensation product of Example 4 according to the invention.

TABLE II

|  | Product of Example 1 | Product of Example 4 |
|---|---|---|
| Thermogravimetric Analysis in air 20° C./min. | $T_1 = 220°$ C. $T_5 = 244°$ C. $T_{10} = 258°$ C. | $T_1 = 257°$ C. $T_5 = 279°$ C. $T_{10} = 287°$ C. |

In order to evaluate and compare the stability to thermo-oxidation of the polymeric compositions containing, as flame-proofing additives, the condensation products described in Examples 1 and 4, one operates according to any known method. For example, the finely ground powders of ammonium polyphosphate, of the condensation product of Example 1 or 4, and of other additives, if any, are first intimately mixed. Successively, the thermoplastic polymer is added, in a turbomixer, to said mixture in order to form a homogeneous mixture which is extruded and granulated.

Using the granulated product so obtained, sheets having a thickness of 3.2 mm (⅛ inch) are molded in a Moore plate press, operating for 7 minutes at a pressure of 40 kg/cm² and at a suitable temperature.

The degree of fire resistance is determined on the sheets so obtained by measuring the oxygen index (O.I.) according to standard ASTM D-2863, and the other evaluations recorded in Table III are made as well.

As thermoplastic polymer was employed an isotactic polypropylene in flakes having a melt flow index equal to 12 g/10 min.

From a comparison between the results obtained with a combination containing the two different flame-retardant additives, it clearly appears that the additive of Example 4 according to the invention is superior to the one of Example 1 prepared as described in U.S. Pat. No. 4,193,945.

TABLE III
Oxygen index (O.I.) and chromatic variations of specimens during aging in a forced draught furnace at 150° C.

| Time in days | 0 O.I. | 0 Color | 30 O.I. | 30 Color | 55 O.I. | 55 Color |
|---|---|---|---|---|---|---|
| Formulation containing the condensation product of Ex. 1* | 30.0 | Light hazel | 25.0 | Black | 20.0 | Black |
| Formulation containing the condensation product of Ex. 4* | 30.0 | White | 27.5 | Hazel tending to brown | 26.0 | Black |

*Specimens molded at 230° C. were used.

Composition of the formulation:

| Components | Parts by weight |
|---|---|
| Polypropylene | 77.3 |
| Product of Example 1 or 4 | 6.0 |
| Ammonium polyphosphate ("Exolit 263") | 15.0 |
| Tetra [3-(3,5-di-t-butyl-4-hydroxy-phenyl) propionate] of pentaerythritol | 0.2 |
| Dilauryl thiodipropionate | 0.4 |
| 2,6-di-t-butyl-p-cresol | 0.1 |
| Magnesium basic carbonate | 1.0 |

What we claim is:
1. A solid and water-insoluble condensation product of N,N'-ethyleneurea and formaldehyde, characterized by the structure

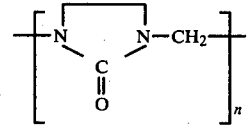

wherein n is an integer from 20 to 60 having a mean value of 41, and by an average number molecular weight $\overline{M}_n$ ranging from 2,000 to 6,000.

2. The product according to claim 1, characterized in that it exhibits, under X-ray analysis, the spectrum of a prevailingly amorphous substance.

3. The process for producing the condensation product of claim 1, which comprises reacting in an aqueous medium, equimolecular amounts of N,N'-ethyleneurea and formaldehyde, at a pH of about 2 and at a temperature of from 0° C. to 40° C., the formaldehyde being added at any time provided the temperature is maintained constant.

4. The process of claim 3, in which the reaction is carried out at 25° C. to 30° C.

* * * * *